(No Model.) 5 Sheets—Sheet 1.
B. C. ROWELL.
BLOCK SYSTEM FOR RAILWAYS.
No. 556,773. Patented Mar. 24, 1896.
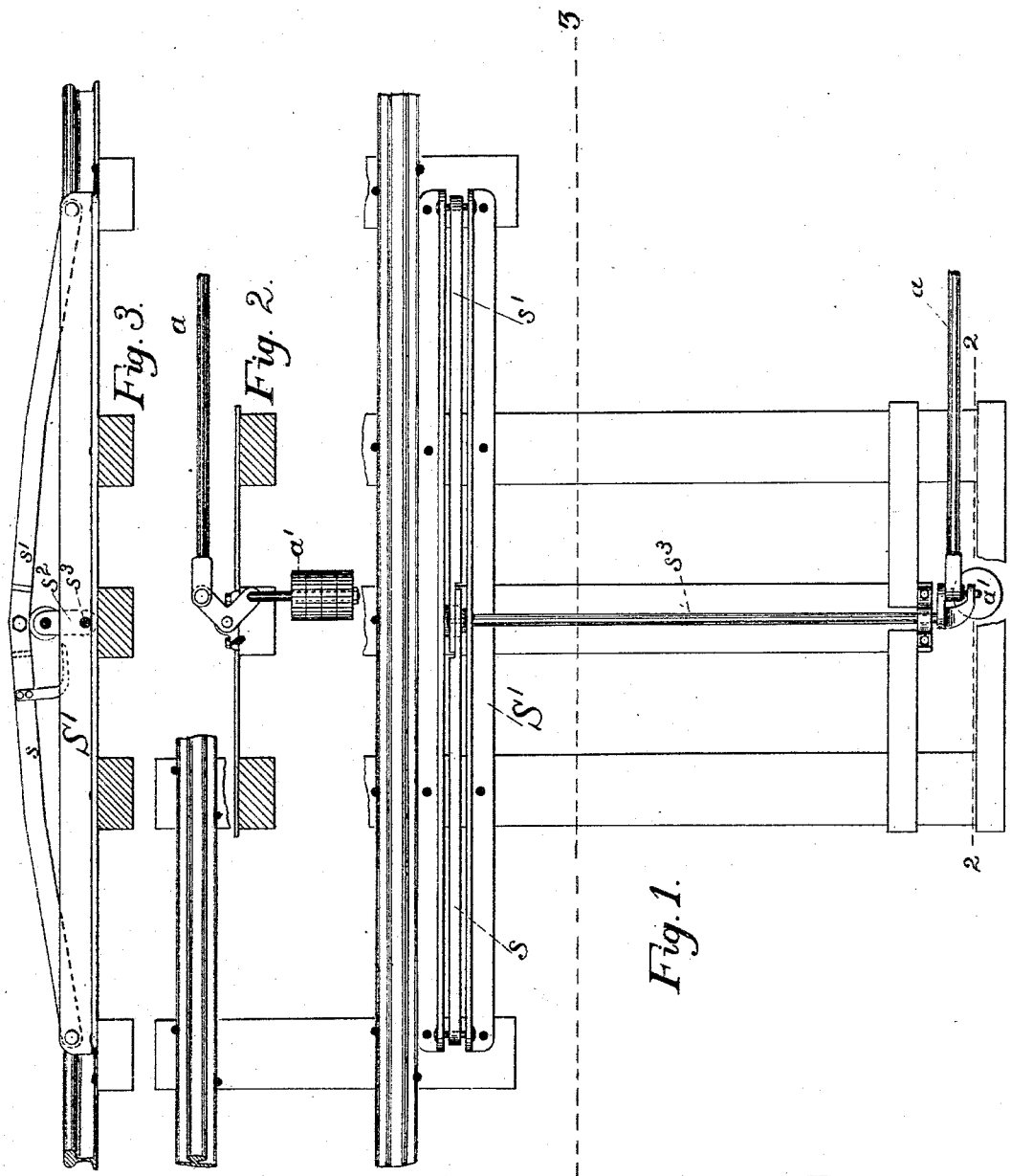

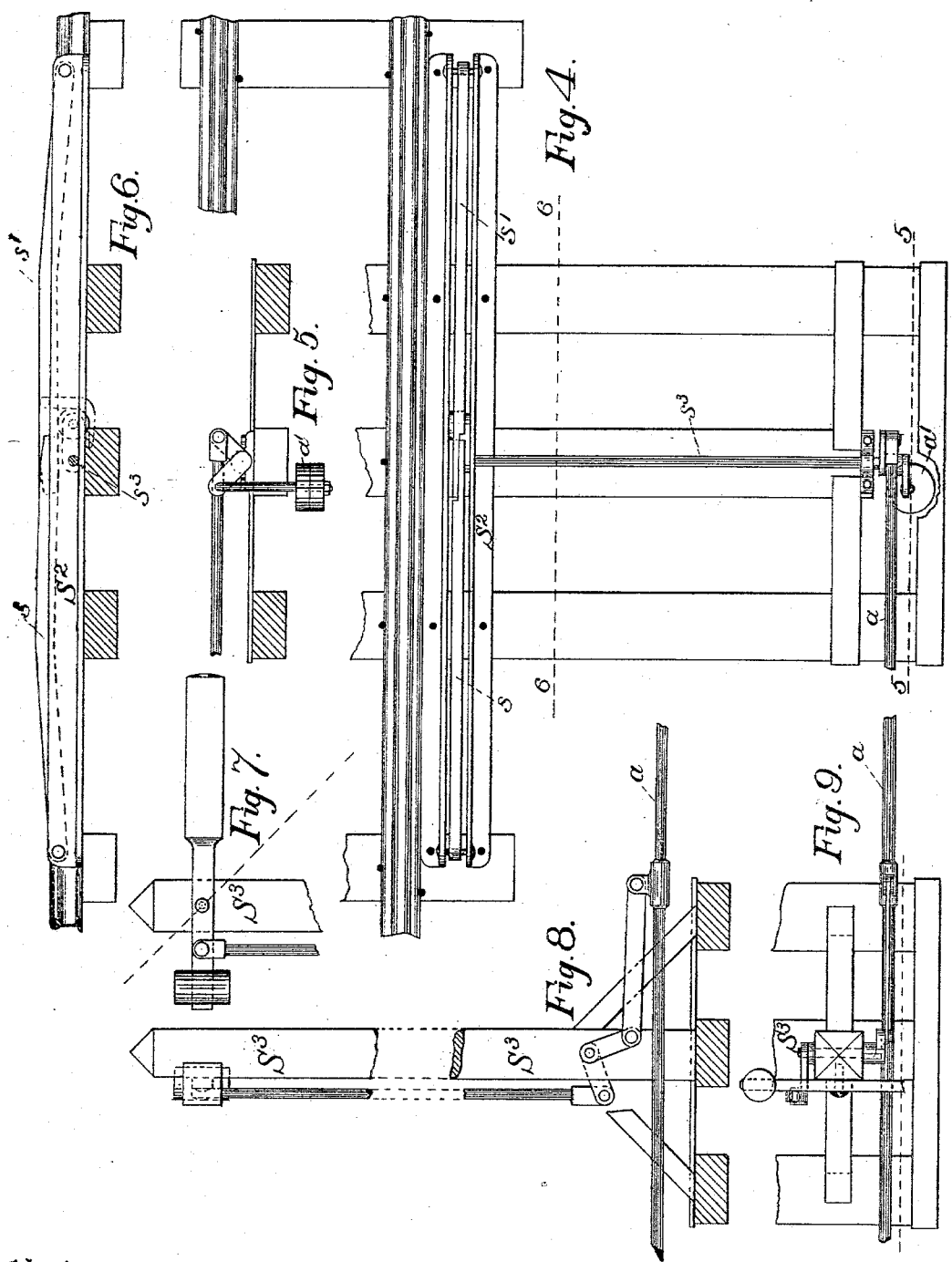

(No Model.)
5 Sheets—Sheet 3.
B. C. ROWELL.
BLOCK SYSTEM FOR RAILWAYS.
No. 556,773. Patented Mar. 24, 1896.
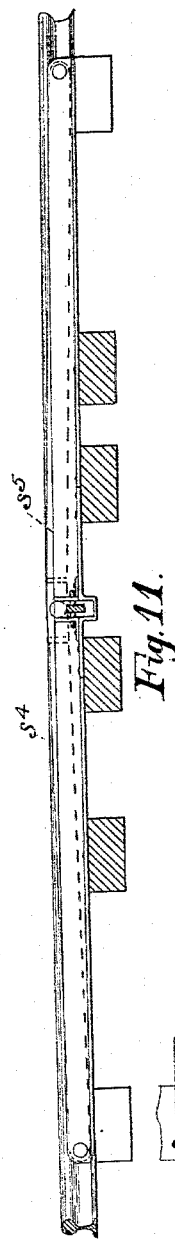
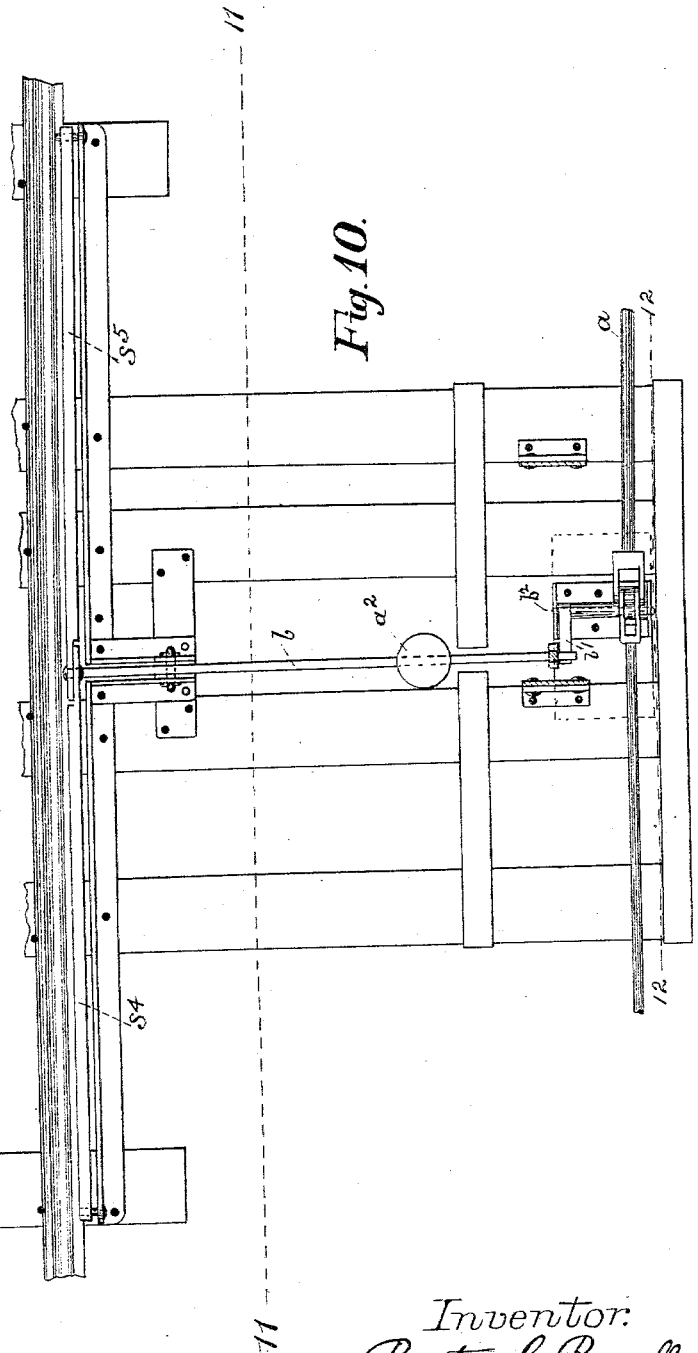
Witnesses.
Inventor:
Benton C. Rowell

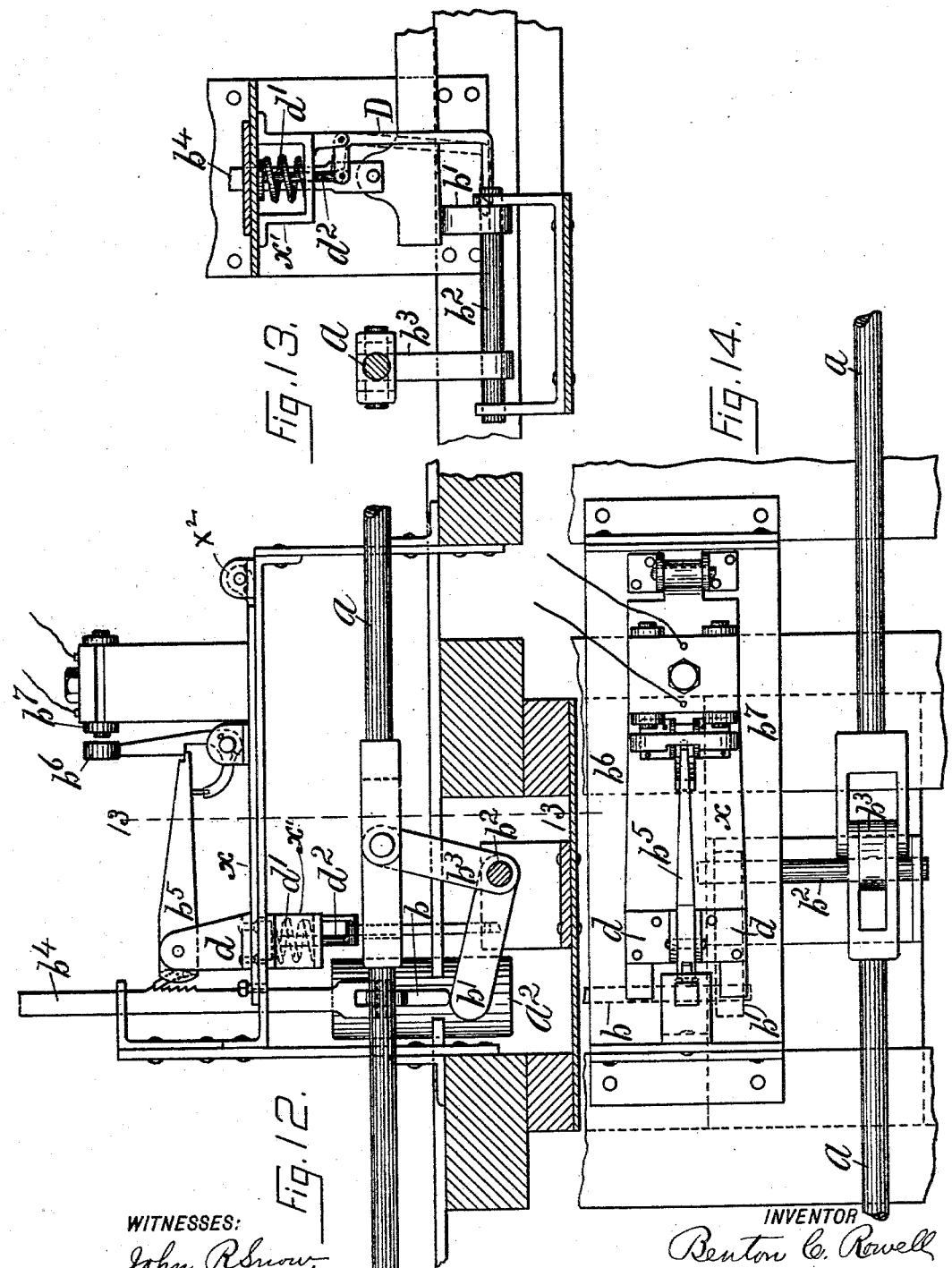

(No Model.)　　　　　　　　　　　　　　　　　　　5 Sheets—Sheet 5.

B. C. ROWELL.
BLOCK SYSTEM FOR RAILWAYS.

No. 556,773.　　　　　　　　　　Patented Mar. 24, 1896.

WITNESSES:
John R. Snow,
H. P. Guillo

INVENTOR
Benton C. Rowell,
BY
J. E. Maynadier
ATTORNEY.

UNITED STATES PATENT OFFICE.

BENTON C. ROWELL, OF BOSTON, MASSACHUSETTS, ASSIGNOR TO THE ROWELL-POTTER SAFETY STOP COMPANY, OF PORTLAND, MAINE.

BLOCK SYSTEM FOR RAILWAYS.

SPECIFICATION forming part of Letters Patent No. 556,773, dated March 24, 1896.

Application filed December 16, 1893. Serial No. 493,859. (No model.)

*To all whom it may concern:*

Be it known that I, BENTON C. ROWELL, of Boston, in the county of Suffolk and State of Massachusetts, have invented a new and useful Block System for Railways, of which the following is a specification, reference being had to the accompanying drawings, in which—

Figure 15:
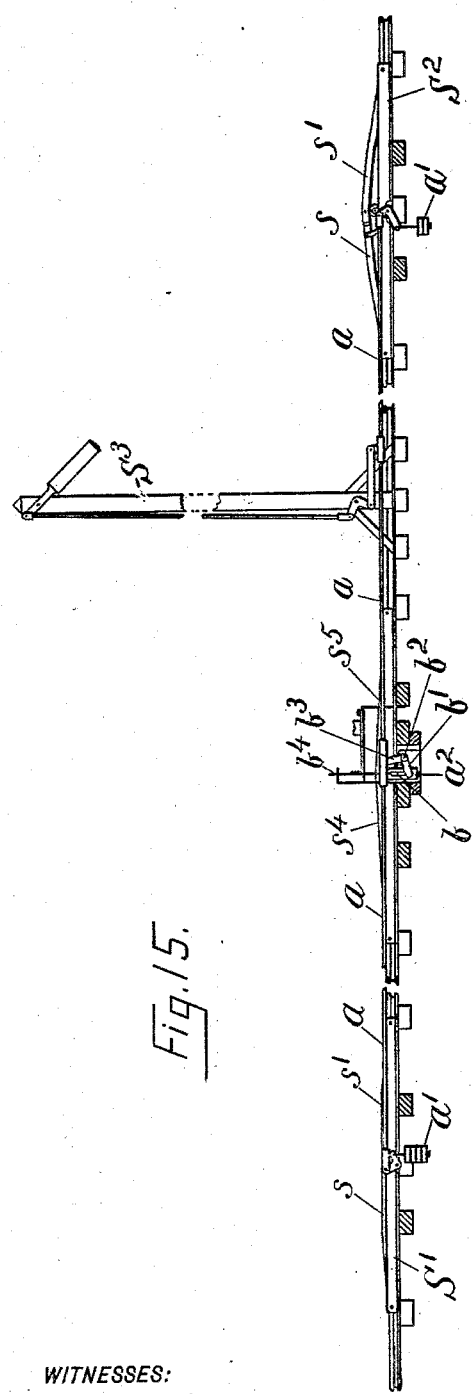
Figure 16:
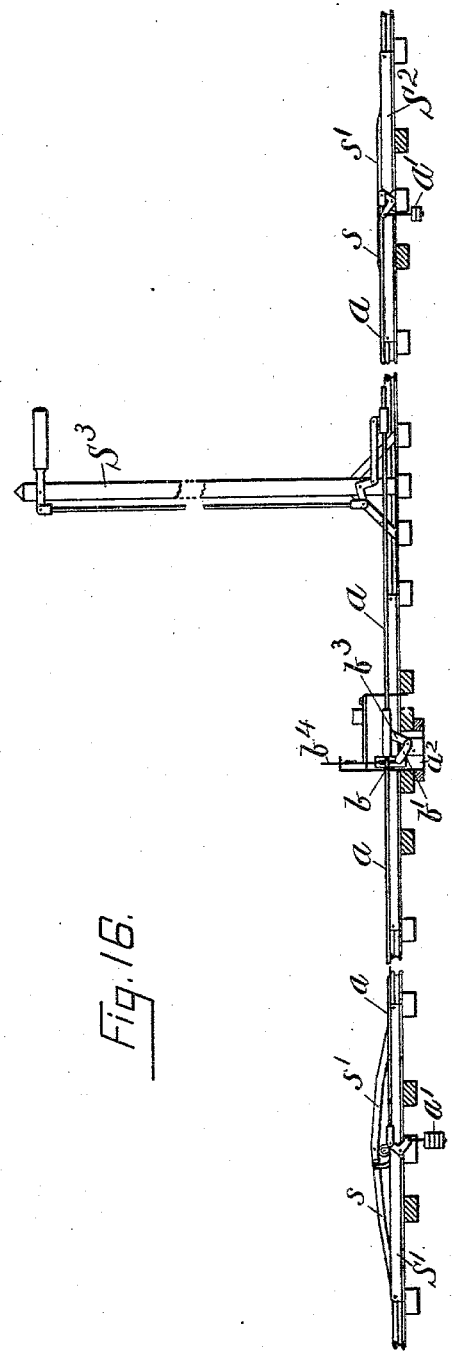

Figure 1 is a plan, Fig. 2 a section on line 2 2, and Fig. 3 a section on line 3 3, both lines on Fig. 1, illustrating one part of my new block system; and Figs. 4, 5, and 6 like views illustrating another feature, the lines 5 5 and 6 6 on Fig. 4 referring to Figs. 5 and 6. Figs. 7, 8, and 9 illustrate a visible signal actuated by the same connection as are the safety-stops of Figs. 1 and 4. Fig. 10 is a plan of a shifting apparatus partly in section. Fig. 11 is a section on line 11 11 of Fig. 10. Fig. 12 is a sectional elevation showing on a large scale for clearness the parts omitted from Fig. 10, the section-line being indicated by 12 12 of Fig. 10. Fig. 13 is a sectional elevation on line 13 13 of Fig. 12, and Fig. 14 is a partial plan of Fig. 12. Figs. 15 and 16 illustrate my system as a whole and in two positions. The visible signal in both figures is shown at right angles to its proper position in order to make the drawings clearer. In Figs. 1, 2, and 3 the parts are shown as they are after a train has entered the block.

In railways with block systems the track is divided into sections, each section being of a desired length—say that length gone over by a train in from two to five minutes or more—the time being inversely as the number of trains, and each of these sections is provided with apparatus such that when a train is on any section a danger-signal is set, which gives warning to the engineer of the following train that that section is occupied, thereby enabling him to preserve a proper distance between his train and a preceding train. This alone, however, would not be sufficient, for it is necessary that the apparatus should be such as not only to set a danger-signal at the beginning of a section when a train gets on that section, but also such that the danger-signal shall be withdrawn when the train leaves that section, so that the following train need not be delayed. These two duties—one to set a danger-signal when a train enters a section, the other to change that signal from "danger" to "safety" when that train leaves that section—are well performed by apparatuses now known, so long as they are in working order.

I have shown two signal apparatuses at the entrance of the section—one a safety-stop S', which is a mechanism for automatically stopping the train by applying the air-brakes, and is well described in Patents No. 217,144, dated July 1, 1879, and No. 444,962, dated January 20, 1891, and the other the usual visual signal apparatus S³—these apparatuses being connected and acting together, and each going to "danger" except when held to "safety" by the shifting apparatus and connecting mechanism.

I use the term "signal apparatus" as including all mechanism which when in one position either warns the engineer to stop the train or acts automatically to stop the train whether with or without warning to the engineer, and which when in its other position does not so act—that is, all mechanism which when in one position is at "danger" or "line closed," and when in the other position is at "safety" or "line clear."

The first feature of my invention is a block system consisting of two signal apparatuses, mechanism connecting them, and a shifting apparatus operated by the passage of a train to control the connecting mechanism, usually at the entrance to a section and so organized that a train entering the section passes the first signal apparatus, then at "safety," next passes the shifting apparatus, and next passes the second signal apparatus. The passage of the train over the shifting apparatus releases the connecting mechanism and permits the first signal apparatus to go to "danger," which shifts the second to "safety," for the signal apparatuses are so organized that when the first signal apparatus is at "safety" the second must be at "danger," and when the first is at "danger" the second must be at "safety," the object being to make it absolutely certain that the apparatus shall under all conditions have at least one portion of it set to "danger," and therefore it will be always sure when out of order to block the section, so that when a train is unnecessarily stopped, attention is at once called to the fact that the apparatus is out of order.

When used as a block system the two safety-stops $S'$ $S^2$, the signal $S^3$, and the shifting apparatus work together at the entrance of a section as follows: If the section be clear the counterweight $a^2$ of the shifting apparatus will be at its lowest point, and the stop $S'$ and signal $S^3$ will be held by the counterweight $a^2$ at "safety," but the stop $S^2$ will be held at "danger." As the section is clear the train will enter, and on passing the shifting apparatus will raise counterweight $a^2$, which will be caught and held by the trip $b^5$ of the shifting apparatus, and stop $S'$ and signal $S^3$ will go of themselves from "safety" to "danger," and stop $S^2$ will go from "danger" to "safety." When the train leaves the section, the trip $b^5$ of the shifting apparatus is released, the counterweight $a^2$ is thereby released, and the stop $S'$ and the signal $S^3$ are shifted from "danger" to "safety" and the stop $S^2$ from "safety" to "danger." All these signals $S'$, $S^2$ and $S^3$ are so connected that $S'$ and $S^3$, in the example shown, will be at "danger" when $S^2$ is at "safety," and vice versa, and the simplest way of effecting this is to connect all three signals by a single connecting-rod $a$, which is shown as directly connected to one arm of rock-shaft $s^3$ of safety-stops $S'$ and $S^2$, and connected by a link to rock-shaft of visible signal $S^3$. (See Figs. 7, 8, and 9.) Therefore when rod $a$ is moved in one direction $S'$ and $S^3$ go to "danger" and $S^2$ to "safety," and when rod $a$ is moved in the other direction $S'$ and $S^3$ are set at "safety" and $S^2$ goes to "danger." When rod $a$ is left to itself, the counterweight $a'$ of $S'$ is sufficient to move it into the position shown in the drawings and set $S'$ and $S^3$ at "danger" and $S^2$ at "safety," raising the counterweight $a'$ of $S^2$. When in this condition the section is blocked by $S'$ and $S^3$, but the counterweight $a'$ of $S'$ is acting against the counterweight $a$ of $S^2$, and in addition is controlled by the weight $a^2$ on lever $b$ of the shifting apparatus, as will now be described.

The best form of shifting apparatus is shown in Figs. 10 to 14, inclusive, and consists of a lever $b$ weighted by weight $a^2$ sufficient when lever $b$ is released to cause it to move arm $b'$ on rock-shaft $b^2$, and thus through arm $b^3$ move rod $a$ endwise and thereby shift $S'$ and $S^3$ from "danger" to "safety" and permit the counterweight $a'$ of $S^2$ to carry $S^2$ from "safety" to "danger," thereby unblocking the section. If now a train enters the section so unblocked, it will in passing over the arms $s^4$ $s^5$ (see Fig. 11) depress them and with them the outer end of lever $b$, thereby raising weight $a^2$ and also raising the inner end of lever $b$ and with it the rod $b^4$, the teeth on which are caught by the catch on the lever $b^5$, so that lever $b$ and weight $a^2$ are held in their elevated position until lever $b^5$ is released by the detent on the armature $b^6$, which is done by energizing the magnet $b^7$, this magnet being energized by the passage of the train from the section, as will be clear without description, that being a matter well known to all skilled in the art; but when lever $b$ has been elevated by the passing train it no longer holds arm $b'$ down, and the weight $a'$ of signal $S'$ moves rock-shaft $s^3$ of $S'$ and through it moves rod $a$ endwise, thereby setting $S'$ and $S^3$ to "danger" and $S^2$ to "safety," and also bringing arm $b'$ of rock-shaft $b^2$ close up to and under lever $b$, as shown in Fig. 12. It will now be clear that when $S'$ and $S^3$ are at "danger" $S^2$ will be at "safety," and the automatic shifting apparatus will be so set that the release of a detent is necessary to shift $S'$ and $S^3$ to "safety" and $S^2$ to "danger;" also that when the detent or armature $b^6$ releases lever $b^5$ the catch on lever $b^5$ releases rod $b^4$ and lever $b$ falls by reason of weight $a^2$, carrying with it arm $b'$, and thus moving rock-shaft $b^2$ and its arm $b^3$, which moves rod $a$ endwise and shifts $S'$ and $S^3$ from "danger" to "safety" and $S^2$ from "safety" to "danger," unblocking the section, so that the section is blocked by the passage of a train over the automatic trip and unblocked when the detent on the trip is released.

As an additional precaution I use an automatic lock to prevent motion of rod $a$ endwise after it has been moved by the fall of weight $a^2$ on lever $b$ until the lever $b$ is again hung up by means of rod $b^4$ upon lever $b^5$. Thus in case of the failure of the passing train to set the shifting mechanism the opposed safety-stops cannot move and the train is brought to a stop by the stop $S^2$ and the failure to work of the shifting apparatus is at once made known. To accomplish the locking of the rod $a$, I mount the fulcrum of lever $b^5$, Fig. 12, on a support $d$, which is fast to and carried by swinging table X, which is hinged at $X^2$ to a table Y. Fast to the bottom of table Y is a bracket X', and directly over this bracket there is an aperture. (Shown in dotted lines in Fig. 12.) The head of plunger $d^2$ bears upon the bottom of table X through the aperture in table Y, and the stem of plunger $d^2$ works through the bottom of bracket X' and a spiral spring $d'$ tends constantly to throw plunger $d^2$ and table X upward. The lower end of plunger $d^2$ is pinned to the end of the short arm of bell-crank bolt D, which swings upon a pivot fast to the bottom of bracket X'.

The operation of the automatic lock is as follows: As a train passes out of a section the lever $b^5$ is released from detent $b^6$, the weight $a^2$ carries down lever $b$ and moves bell-crank lever $b'$ $b^3$ to throw rod $a$ to the left. (See Fig. 12.) The freeing of lever $b^5$ from the weight $a^2$ allows spring $d'$ to throw up plunger $d^2$ and move table X upward. The raising of plunger $d^2$ moves the bolt of bell-crank bolt D forward over arm $b'$, and thus locks rod $a$ until the bolt is withdrawn. The bolt is withdrawn when the shifting apparatus is reset by the passage of a train. The hanging up of the weight $a^2$ upon lever $b^5$ forces table X down against the resistance of spring $d'$, and, through plunger $d^2$, the bell-crank bolt is thrown from the locked position shown in dotted lines in Fig. 13 to the unlocked position shown in full lines.

It will be obvious that the mechanical details of this device are unimportant and that the feature of this part of my invention is the combination of an automatic locking device with the two signals and the shifting apparatus between them.

I prefer to connect the two signals mechanically, as by connecting-rod $a$, but the gist of the matter is that they be connected in order that they will shift together, and that both will be controlled by the automatic shifting apparatus, so that when the shifting apparatus is set by the passage of the train both signals will shift, and when the trip of the shifting apparatus is released both will shift back. The mechanical details of the automatic shifting apparatus are also of little importance, as will be clear to all skilled in the art, so long as the shifting apparatus permits the signal apparatuses to shift when the train passes over the shifting apparatus in an apparatus embodying the first feature of my invention. While I have described my telltale signal system as requiring two safety-stops as distinguished from audible or visible signals, yet, as this feature of my invention is wholly new with me, so far as I know, my invention will be embodied whatever signal apparatus, whether giving warning that the train should be stopped or acting in itself to stop the train, be used, although its full result, which is an automatic block system absolutely sure, whether in working order or not, to block its section by actually stopping any train which has no right of way over that section, if the apparatus be in working order, or whether it has a right of way or not if the apparatus be out of order, can only be obtained by the use of safety-stops.

What I claim as my invention is—

1. In combination two opposed signal apparatuses; mechanism connecting them and keeping them always in opposed positions and an automatic shifting apparatus operated by the passage of a train and operating their connecting mechanism to shift the opposed signal apparatuses, substantially as described.

2. In combination two opposed signal apparatuses; mechanism connecting them and keeping them always in opposed positions and an automatic shifting apparatus between the signal apparatuses and operated by the passage of a train operating the connecting mechanism to shift the opposed signal apparatuses, substantially as described.

3. In combination two opposed signal apparatuses, mechanism connecting them and keeping them always in opposed positions; an automatic shifting apparatus operated by the passage of a train and operating the connecting mechanism and an automatic lock, locking the connecting mechanism and unlocked by the shifting apparatus; all substantially as described.

4. A signal-operating apparatus comprising the following instrumentalities, lever, $b$, crosswise of the track; main counterweight, $a^2$, carried by that lever; tread-pieces $s^4 s^5$ connected to lever $b$; means to catch and hold lever $b$ in its elevated position when raised by the passage of the train; rod $a$ lengthwise of the track; means to connect lever $b$ with rod $a$, (as a rock-shaft and its arms;) a second counterweight, $a'$; means to connect that counterweight with the rod $a$, (as a bell-crank lever;) and means to connect rod $a$ with the signal to be operated; substantially as and for the purpose specified.

BENTON C. ROWELL.

Witnesses:
WILFRED E. POTTER,
D. F. PUTNAM.